United States Patent
Hajiyev et al.

(10) Patent No.: US 10,796,341 B2
(45) Date of Patent: Oct. 6, 2020

(54) METHOD OF GENERATING WEB-BASED ADVERTISING INVENTORY AND TARGETING WEB-BASED ADVERTISEMENTS

(71) Applicant: REALEYES OÜ, Tallinn Harju (EE)

(72) Inventors: Elnar Hajiyev, London (GB); Martin Salo, London (GB)

(73) Assignee: REALEYES OÜ, Tallinn Harju (EE)

( * ) Notice: Subject to any disclaimer, the term of this patent is extended or adjusted under 35 U.S.C. 154(b) by 261 days.

(21) Appl. No.: 15/123,915

(22) PCT Filed: Mar. 5, 2015

(86) PCT No.: PCT/EP2015/054681
§ 371 (c)(1),
(2) Date: Sep. 6, 2016

(87) PCT Pub. No.: WO2015/135841
PCT Pub. Date: Sep. 17, 2015

(65) Prior Publication Data
US 2017/0018008 A1 Jan. 19, 2017

(30) Foreign Application Priority Data
Mar. 11, 2014 (GB) .................... 1404234.5

(51) Int. Cl.
*G06Q 30/00* (2012.01)
*G06Q 30/02* (2012.01)
*G06F 16/9535* (2019.01)

(52) U.S. Cl.
CPC ..... *G06Q 30/0269* (2013.01); *G06F 16/9535* (2019.01); *G06Q 30/0251* (2013.01); *G06Q 30/0277* (2013.01)

(58) Field of Classification Search
None
See application file for complete search history.

(56) References Cited

U.S. PATENT DOCUMENTS

| | | |
|---|---|---|
| 6,295,061 B1 | 9/2001 | Park et al. |
| 8,401,248 B1 | 3/2013 | Moon et al. |
| 2004/0181457 A1 | 9/2004 | Biebesheimer et al. |
| 2010/0169792 A1* | 7/2010 | Ascar .................. G06F 11/3414 715/744 |
| 2011/0301433 A1 | 12/2011 | Sadowsky et al. |
| 2012/0072936 A1 | 3/2012 | Small et al. |
| 2012/0130822 A1 | 5/2012 | Patwa et al. |
| 2012/0324494 A1 | 12/2012 | Burger et al. |

(Continued)

FOREIGN PATENT DOCUMENTS

| | | |
|---|---|---|
| AU | 2011/265090 A1 | 12/2011 |
| JP | 2010027086 A | 2/2010 |

(Continued)

*Primary Examiner* — Alvin L Brown
(74) *Attorney, Agent, or Firm* — Leason Ellis LLP

(57) ABSTRACT

Embodiments of the invention provide analytics in regard to behavioural data for improved computer-resource utilization, more particularly, in connection with a computer-implemented method of using behavioural data collected for a user (and in particular emotional response data obtained from facial images of the user) to generate or otherwise control ad inventory or ad display on the fly.

11 Claims, 4 Drawing Sheets

(56) References Cited

U.S. PATENT DOCUMENTS

| | | | |
|---|---|---|---|
| 2013/0085851 A1* | 4/2013 | Pedro | G06Q 30/0255 |
| | | | 705/14.53 |
| 2013/0290994 A1 | 10/2013 | Machado | |
| 2014/0007149 A1 | 1/2014 | Huang et al. | |
| 2014/0052567 A1 | 2/2014 | Bhardwaj et al. | |
| 2014/0058828 A1 | 2/2014 | el Kaliouby et al. | |
| 2014/0112540 A1 | 4/2014 | el Kaliouby et al. | |
| 2015/0073899 A1* | 3/2015 | Carpenter | B62B 3/1408 |
| | | | 705/14.49 |
| 2018/0157760 A1* | 6/2018 | Garg | G06F 17/3053 |

FOREIGN PATENT DOCUMENTS

| | | |
|---|---|---|
| JP | 2011065658 A | 3/2011 |
| JP | 2012155616 A | 8/2012 |
| WO | WO 2012/068193 A2 | 5/2012 |
| WO | WO 2011/156272 A1 | 11/2012 |
| WO | WO 2013/176671 A1 | 11/2013 |

* cited by examiner

METHOD OF GENERATING WEB-BASED ADVERTISING INVENTORY AND TARGETING WEB-BASED ADVERTISEMENTS

CROSS-REFERENCE TO RELATED APPLICATIONS

This application is a U.S. National Stage Application under 35 U.S.C. § 371 of International Patent Application No. PCT/EP2015/054681, filed Mar. 5, 2015 which claims priority to GB Application No. 1404234.5, filed Mar. 11, 2014, which are hereby incorporated by reference in their respective entireties.

FIELD OF THE INVENTION

The invention relates to the generation of web-based advertising inventory, e.g., advertising space provided with or in other web content, and the allocation of advertisements to available inventory. In particular, embodiments of the invention relate to the processing and analysis of user behavioural (e.g. emotional) data detected for a user for the purposes of enhancing the provision of web advertising. The use of such processing and analysis allows systems utilized by advertisement producers, distributors, network operators and similar entities to be responsive to such processing and analytics so as to limit transmission of certain advertising content to only those users that express a behavioural interest in receiving such advertisements, thereby conserving network and computational resources.

BACKGROUND TO THE INVENTION

Online advertising comprises a large part of the display and video advertising market. It is desirable for a web-based advertisement (referred to herein as an ad) to be displayed to relevant consumers, in order to maximise the influence of the ad, and hence the advertiser's return on investment.

Online advertising networks, demand side platforms, supply side platforms and real-time bidding platforms provide an interconnection between advertisers seeking to serve their content to prospective consumers and website hosts willing to display ads. The website hosts provide web-based advertising inventory, which can be filled by advertiser's content. Advertising inventory can take many forms, including space on a website, e.g., a side banner, pop-up windows, slots for video media, etc.

Advertisers have explored a programmatic approach to ad buying, including systems in which computational logic (rules, algorithms, etc.) is used to automate the purchase and targeting of ads. Programmatic buying is applicable across numerous types of digital ad supply systems. For example, targeted advertising networks are a type of online advertising network that aims to serve ads more effectively by using information about a user and/or the context associated with any given piece of web-based advertising inventory. For example, a user's browsing history (e.g. in the form of the clickstream) can be used to generate a user profile. Advertisers may seek to display their ads to users whose profiles are relevant to the ad or to the intended market.

US 2012/0130822 discloses an method of providing advertising in an interactive gaming environment, where the initial advertisement presented is based on user input comprising an audible input, a gesture or a recognised emotion.

Similarly, US 2012/0072936 discloses a system for serving a targeted advertisement to a user based on an emotional response of a user to multimedia content.

SUMMARY OF THE INVENTION

At its most general, the present invention proposes using behavioural data collected for a user (and in particular emotional response data obtained from facial images of the user) to generate or otherwise control ad inventory or ad display on the fly. Herein "ad inventory" means a data structure that identifies properties of an opportunity to display a web-based advertisement. In other words, the ad inventory is an advertising space in (or presented in conjunction with) a digital asset that is capable of being filled with advertising content, e.g., a web page or pop-up window displayed in conjunction with a web page.

Thus, in a first aspect, the present invention provides a method of generating web-based advertising inventory, the method comprising: collecting behavioural data for a user during playback of media content on a networked computing device; and generating an ad inventory if the collected behavioural data satisfies a predetermined condition. In other words, the collected behavioural data can provide a trigger for generating a piece of online advertising space, and, collecting can include in some embodiments processing of the collected data into metrics. The networked computing device can be any device capable of playing back media content and transmitting and receiving data over a network (wired or wireless). For example, the networked computing device can be any type of computer (e.g., PC, laptop, tablet) or a network-enabled television, or a smartphone. The generated ad inventory may be used in an ad request over a network (e.g., over the Internet). The response to the ad request may be served to the networked computer device.

Herein, the term "behavioural data" is used to mean any data concerning the activity or status of the user. It can comprise emotion state data, e.g., information indicative of the user's emotion at any given time. Emotion state data can be obtained in any way, e.g. from facial images or other physiological indicators obtained via a webcam. Behavioural data can also include data concerning the user's interaction with the computer, e.g., audio data, click data or other data indicative of the user's interest in a portion of the display. In addition to behavioural data, embodiments of the invention can also provide for the collection and transmission of other user data indicative of other details about the user, such as, gender, age, location, etc.

In accordance with various embodiments of the invention, the networked computing device comprises a data collection module arranged to process the collected behavioural data, or transmit the collected behavioural data to a remote analysis server for processing. The data can be sent as a video stream or as a series of extracted images e.g., still image frames periodically extracted from a video stream.

The analysis server or the networked computing device can be arranged to process the behavioural data to extract data representative of one or more emotional states. For example, the analysis can generate a metric for each of six universal emotions, e.g., happiness, sadness, surprise, fear, disgust and anger. The analysis can also generate one or more further metrics that may be independent of the emotions or based on other combinations of facial feature movement. The further metrics can include, but are not limited to, engagement, attentiveness, boredom, confusion, neutrality and valence. Behavioural data can also comprise measures like heart rate which can be read visually by slight changes of skin colour. Any one or any combination of the metrics can be used as a basis for generating the ad inventory.

Such metrics can be transmitted to the remote server in lieu of the raw captured image data for an efficient data transfer from each local computer to the remote server, again resulting an improved usage of computational resources and a more minimized impact on the data upload from each individual local computer.

Thus, the method according to certain embodiments can comprise evaluating a behaviour criterion using the collected behavioural data (or any metric derived therefrom) to determine if the predetermined condition is satisfied. Evaluating a behaviour criterion canthus comprise generating data representative of one or more emotional states of the user. In accordance with one embodiment, the step of evaluating a behaviour criterion comprises: generating an engagement metric value that is indicative of the user's engagement with the media content; and comparing the extracted engagement metric value with a predetermined threshold. These steps can be performed on the networked computing device itself or at the remote analysis server.

The step of evaluating a behaviour criterion can be performed a plurality of times, e.g., periodically, throughout playback of the media content. The evaluation step can take a snapshot, e.g. an instantaneous value, of one or more metrics based on the behavioural data at the time of assessment. Alternatively, the step of evaluating a behaviour criterion can comprise calculating the time evolution of a behaviour criterion over a period of data within the duration of the media content. The period may be the entire duration of the media content, or a final portion thereof, by way of determining whether or not to serve an ad at the end of the media content. Alternatively, the method can perform analyses to detect and consider a change in the user's emotional state during the media content as a trigger for an ad inventory.

The step of generating the ad inventory can occur at the same location as the step of evaluating a behavioural criterion (and the step of generating data representative of emotion states from the captured images). Thus, in one embodiment, the networked computing device performs both steps, whereby the analysis of the user's behavioural data and the generation of ad inventory based on that data is performed locally.

Alternatively, one or both steps can be performed at a device remote from the networked computing device. For example, the networked computing device can communicate information indicative of a user's behavioural data to a remote server, which is arranged to generate ad inventory based on the received behavioural data. In one embodiment, the step of generating the ad inventory occurs at an ad server that is located remotely from the networked computing device, and that is in communication with the networked computing device over a network. The analysis server and the ad server may thus be the same device.

One or more properties of the ad inventory may be influenced by the collected behaviour data. Thus, the method can comprise determining a property of the ad inventory based on the collected behavioural data. The determined property may be one or more ad inventory parameters, e.g., one or more of: duration, ad type, and ad size.

Moreover, the method can further comprise including information about the user's emotional state within the ad inventory itself, which thus makes it available to advertisers as another parameter to consider when deciding whether or not to purchase the ad inventory. Thus, the method can comprise generating an ad inventory profile parameter based on the collected behavioural data (or any metric or emotional state derived therefrom), wherein the generated ad inventory comprises the ad inventory profile parameter. Ad inventory purchasing processes are often automated, e.g. as a real time bidding process or the like. In that situation, the advertisers can provide an ad profile parameter that is based on desirable behavioural data characteristics and which is comparable with the ad inventory profile parameter to assess compatibility. This idea is discussed in more detail below.

Embodiments of the invention can be expressed as a method of controlling a web-based advertising display, the method comprising: serving an ad for display on a networked computing device; collecting behavioural data for a user of the networked computing device while the ad is displayed thereon; and adapting an ad display condition on the networked computing device based on the collected behavioural data. In other words, the way in which ads are display on the networked computer device may be adapted based on the collected behavioural data (e.g., a detected behavioural or emotional state or information derived from a plurality of detected behavioural or emotional states of the user).

The ad display condition may relate to the specific ad being displayed during collection of the behavioural data. Thus, the step of adapting an ad display condition can comprise controlling a current ad display, e.g., by changing one or more properties of the ad display based on one or more properties of the collected behavioural data. For example, if the behavioural data indicates that the user is not engaged with a current ad, the ad display can be restricted, e.g., shortened, terminated or made less obtrusive. Conversely, if the behavioural data indicates that the user is engaged with the current ad, the ad display can be extended. Extending the ad display can provide additional ads either simultaneously with or after the current ad. Thus, the step of controlling the current ad display can comprise extending the ad display, e.g., by generating additional ad inventory if the collected behavioural data satisfies the first predetermined condition. The additional ad inventory may be generated using the process outlined above.

Alternatively or additionally, the ad display condition can relate to future ad displays on the networked computer device. For example, the collected behavioural data can indicate a user's preference for (e.g., a positive emotional response to) a particular type of ad display. Or the ad display condition can be set to cancel all future ads, e.g. on the basis that the user is not engaged.

By tying the ad display to user behavioural data, embodiments of the present invention minimize the need to unnecessarily transmit advertisements to uninterested users, thereby network usage and processor loads. Such savings can result in appreciable benefits, for example, when operating in a mobile environment such that battery life is prolonged and device performance is not adversely impacted by unnecessary receipt and processing of ads, as well as collection and possible processing of user behavioural data. Network operators also benefit by reducing or otherwise eliminating transmission loads caused by the transmission of unwanted or otherwise ineffective ads.

The step of adapting the ad display condition can comprise comparing the collected behavioural data (or any metric or emotional state derived therefrom), e.g., the current behavioural data for the user, with comparison data in order to determine further action. The comparison data can be past behavioural data for the user, e.g., data stored in a user behavioural data profile, or can be generic behavioural data, e.g., obtained by aggregating behavioural data from other users. Alternatively, the comparison data can be made against a simple threshold, e.g., representing a predetermined minimum level of engagement or other behavioural data (e.g., one or more emotions). If upon comparison it is determined that the collected behavioural data falls below the threshold, the method can adapt an ad display condition as discussed above. There can be a plurality of threshold parameters, whereby each threshold is associated with a corresponding ad display condition adaptation.

In various embodiments, the step of adapting the ad display condition comprises terminating or shortening a current ad display if the collected behavioural data fails to meet a predetermined behaviour criterion in a similar manner to that discussed above. In other words, the method can comprise evaluating a behaviour criterion using the collected behavioural data (or any metric or emotional state information derived therefrom) to determine if a step of adapting an ad display condition is to be executed. The behaviour criterion can relate to the user's engagement with an on-going ad display.

As mentioned above, embodiments of the invention also propose using collected behavioural data as a parameter for determining the potential effectiveness of an ad served in response to a given ad inventory. In particular, the invention proposes aggregating behavioural data obtained from a plurality of ad impressions obtained for a given ad, and using the aggregated information to establish a behavioural data profile or target for the ad.

Thus, according to a second aspect, the present invention provides a method of profiling web-based advertisements, the method comprising: serving an ad to a plurality of networked computing devices; collecting, in each of the plurality of networked computing devices, behavioural data for a respective user of each of the plurality of networked computing devices during display of the ad; receiving the collected behavioural data from each of the plurality of networked computing device at a central server; aggregating the received behavioural data, and generating an ad profile parameter for the ad based on the aggregated behavioural data. The collected behavioural data can be included in an ad impression generated for each of the plurality of networked computing devices. As more ad impressions are received, the ad profile parameter can be updated to take account of changes in the aggregated behaviour data. The ad profile parameter can be based on emotional data generated from the aggregated behavioural data (or any metric or emotional state derived therefrom).

The ad profile parameter enhances the ability to target ads by providing an additional dimension of comparison between the ad and the user about to view the ad for use by a processor executing code to implement the functionality described herein. For example, a given user may have an associated user profile that is indicative of his or her browsing preferences. The ad profile parameter can be compared with a user profile to assess if a user is receptive to the ad concerned. The user profile can comprise one or more behavioural parameters about the user's reaction to previously displayed ads or subject matter. Again, utilizing behavioural data for ad targeting provides numerous benefits to the operation of networked computing devices—as such, targeting allows for the more efficient use of such computing resources, especially finite bandwidth that may be unnecessarily consumed when transmitting unwanted ads, which may in turn have an adverse impact on device performance.

Where ad inventory is generated on the fly as discussed above, all or part of the user's profile can be included within the parameters of the ad inventory itself. For example, the ad inventory can comprise information that represents one or more behavioural parameters from the user profile that are comparable to the ad profile parameter. Alternatively or additionally, as discussed above, this information can be an ad inventory profile parameter that is based on behavioural data for the user that is collected at or around the time of making an ad call.

Embodiments of the method can comprise receiving an ad request from a computer device, the ad request including an ad inventory having an ad inventory profile parameter that is indicative of behavioural data of a user of the computer device; and comparing the ad profile parameter with the ad inventory profile parameter to assess the compatibility of the ad with the ad inventory. This process may take place within an conventional ad purchase process, e.g., real time bidding or the like.

These and other aspects, features, and embodiments will be more fully appreciated from the accompanying detailed description of certain embodiments of the invention.

BRIEF DESCRIPTION OF THE DRAWINGS

Examples of the invention are discussed below in detail with reference to the accompanying drawings, in which.

DETAILED DESCRIPTION OF CERTAIN EMBODIMENTS OF THE INVENTION

Figure 1:
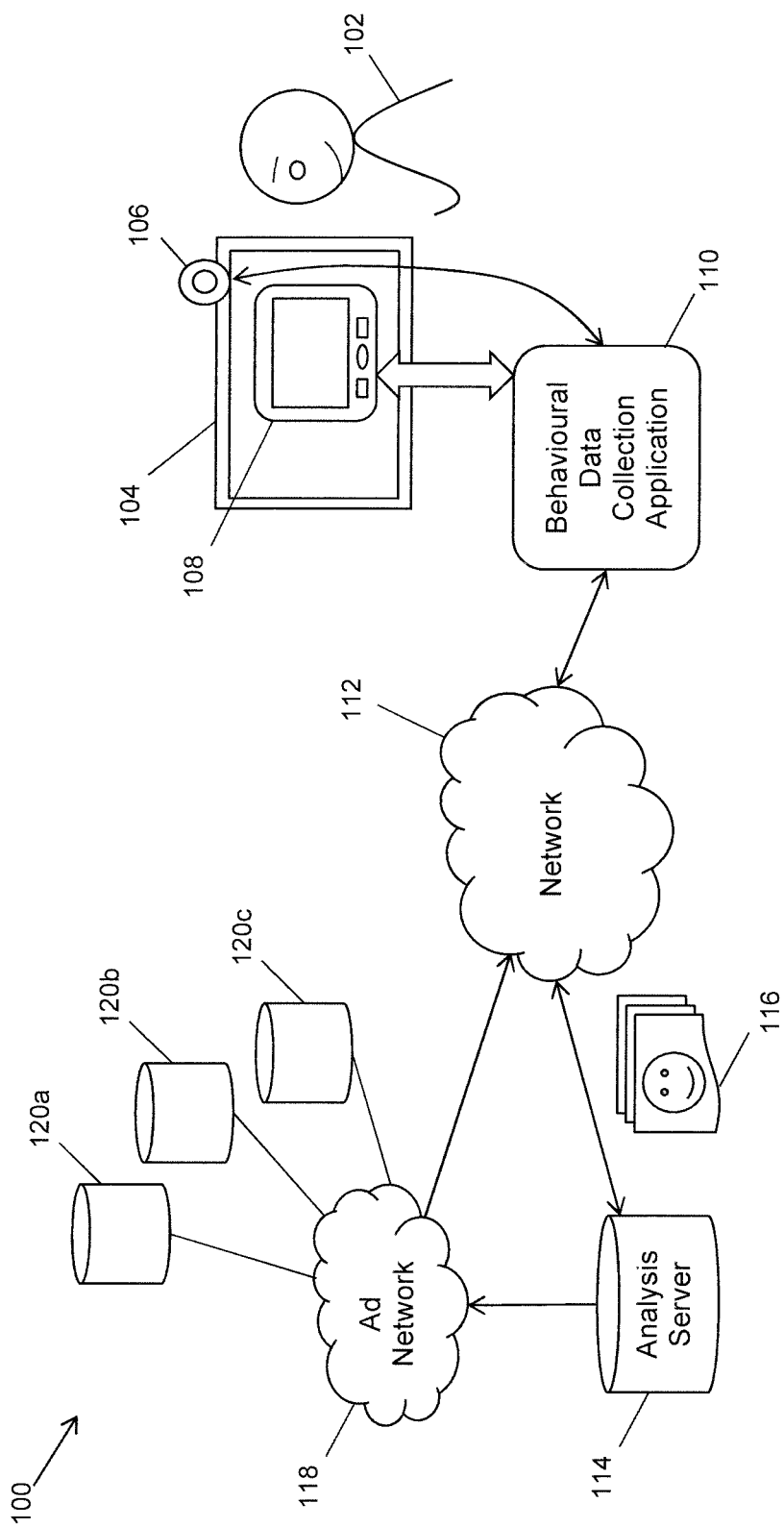
FIG. 1 is a schematic drawing of a system for implementing a method that is an embodiment of the invention.

FIG. 1 depicts an exemplary environment 100 within which embodiments of the present invention operate. A user 102 views media content on a display 104 associated with a network-enabled computing device. The display 104 may be associated with any network enabled computing device. For example, the display 104 may be provided by or connected to a network-enabled television, a set-top box, a gaming console, a PC, a laptop computer, a tablet computer or a smartphone. The computing device is thus capable of sending and receiving data over a network 112, such as the Internet. The media may be displayed via a video player 108, e.g., Windows Media Player, QuickTime Player, Audacious, Amarok, Banshee, MPlayer, Rhythmbox, SMPlayer, Totem, VLC, and xine, or an online video player, such as JW Player, Flowplayer and Brightcove.

The computing device or display 104 is connected to or has inbuilt modules or circuitry for recording behavioural data, such as a microphone, a webcam 106, etc.

The computing device has a behavioural data collection application 110 associated with it, e.g., stored in memory thereon or downloadable or accessible via a network. In practice, the user 102 may receive on the computing device an invitation to participate in a behavioural data collection exercise, e.g., whilst viewing media content on the media player 108. Upon execution, the behavioural data collection application 110 can communicate with a remote analysis server 114 to execute and control the behavioural data collection exercise, as discussed below. The application 110 may be implemented in various combinations of hardware and software, including logic implemented in one or more custom ASICs or programmed in a FPGA.

Herein, the terms "server" and "network-enabled computing device" (or "computing device") are used to mean a computer having at least one processor that executes instructions therein received from a memory store (e.g., RAM) in order to implement functionality useful in connection with one or more embodiments of the invention. These devices further include network interface components comprising hardware configured to enable communications over a network between the server and between one and a plurality of computing devices at which computer user behavioural data is being captured. By way of example and not limitation, the communications can comprise data packets constructed in accordance with a user datagram protocol (UDP) or an Internet protocol (IP). These devices have hardware or software from an accessible memory which execute in respective processors in order to implement the functionality described herein. As such, more general statements described herein regarding the arrangement of an application, steps taken in connection with one or more methods, functions, capabilities, and so on, unless expressly noted otherwise, are all made in relation to servers and/or computing devices configured by code executing a processor.

The behavioural data collection application 110 can be an emotion tracking application for collecting information indicative of the user's emotional state. The data collection application can also be arranged to collect other types of behavioural data. The collected behavioural data can allow the user's emotions to be tracked during the user's interaction with media played back on the video player 108.

The behavioural data collection application 110 can execute or control an initialisation process that sets up communication between the analysis server 114 and the modules or circuitry operative to record behavioural data (e.g., webcam 106), which enables collected data 116 (e.g. webcam images, behavioural data, media attributes, etc.) to be transferred therebetween. For instance, software (which comprises instructions executing in the processor of the computing device) can be used to set up such communication. For example, the initialisation process can comprise setting up (e.g., obtaining authorisation for) communication across the network 112. The collected data 116 can thus be sent over the network to the analysis server 114, where information about the user's emotions can be extracted and used for further processing and analysis.

For instance, the user's emotions can be tracked using code that configures the processor of the local computer to make determinations of the computer user's emotions, such as the six universal emotions mentioned above. Alternatively, the user's emotions can be tracked using code executing at the analysis server 114 that configures the processor of the that server to make determinations of the computer user's emotions, such as the six universal emotions mentioned above, either using the raw captured image data, or, more preferably, using the signals processed by the behavioural data collection application 110 at the local computer prior to transmission to any remote server.

The processing of the collected behavioural data may include several sub-processing steps, at least one which transforms the interactive data that has been collected into data packets suitable for transmission to a remote server, and more preferably to include temporal information related to the video playback and the moment or segment that was being played at the client computer during the collection of the computer user behavioural data.

The collected data can undergo additional processing, before transformation into packets or a file for transmission over a network, in order to coordinate the captured computer user behavioural data with moments or segments of the video provided to the computing device during media playback, including at least moments or segments during media playback of a video ad at the computing device. Such processing includes instructions executing in the processor of the computing device which synchronize the images being captured to a temporal location within the media being played back at the user's computing device, such as by associating a time code or range of time codes of the video with the captured computer user behavioural data. The synchronization can be important to solve latency problems associated with the reception of streamed content at the computing device, associated with local processes (such as those which might change the timing of media playback relative to the transmission of streamed content to the computing device), and events at the computing device which also can affect the time window of media playback (e.g., as one non-limiting example, the user pauses or rewinds playback).

The additional processing in accordance with this aspect of the invention causes temporal information concerning the computer user behavioural data to be included among the data packets being transmitted to the analysis server 114, in addition to the transmission of the computer user behavioural data itself to the analysis server 114.

In further more particularized aspects, the time codes for the moments or segments during which computer user behavioural data is being captured can comprise time offsets relative to a video ad, and optionally relative to other video content being played back in the media playback application.

In still further aspects of the invention, the computing devices can be configured to more efficiently utilize their resources so as to minimize interruption of media during playback. In this regard, system components are monitored and their performance or values are utilized in determinations as to when certain local processing is to be performed. As such, processing of computer user behavioural data can be performed dynamically (starting and stopping) in view of the performance capabilities of the user's computing device on which the processing is being performed and in further view of connectivity between the computing device and the network to which it is connected.

Embodiments of the invention concern processing at the analysis server 114 to generate information for generating or serving online advertisements. The analysis server 114 is arranged to communicate information indicative of the user's emotions to an ad network 118. Although the analysis server 114 and ad network 118 are illustrated as separate entities in the present embodiment, this is not necessary. The analysis of the raw data collected by the behavioural data collection application 110 can take place at any suitable point in the system. For example, the analysis can take place locally, e.g., at the user's device, which may be as part of the functionality of the behavioural data collection application 110. Alternatively, the analysis function carried out by the analysis server 114 can be built into the ad network 118.

The ad network 118 can comprise a server arranged to notify a plurality of advertisers 120a, 120b, 120c of available advertising inventory, and select an ad to be served to fulfil any given inventory. Typically the advertisers 120a, 120*b*, 120*c* communicate with the ad network via an ad exchange (not shown) such as Right Exchange or Double-Click Ad Exchange, which can run bidding platforms or the like to organise the buying and selling of ad inventory. Once an ad is selected to fulfil an inventory, that ad is served to the computing device via the network 112.

According to embodiments of the present invention, the collected behavioural data (e.g., the user's emotional data or any metric or emotional state derived therefrom) is used to generate ad inventory. In other words, the creation and properties of an opportunity to display an ad are based at least partly on collected behavioural data. This differs from known advertisement provision, in which the nature of the advertising slots are predetermined, even if the content of the ad is variable based on other information.

Figure 2:
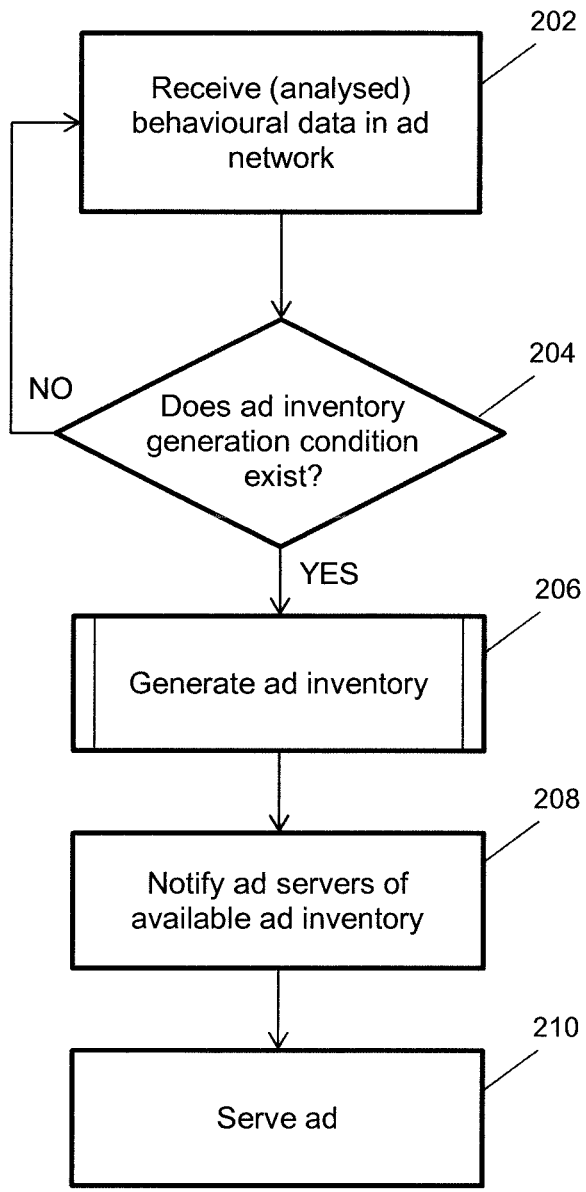
FIG. 2 is a flow chart depicting an ad inventory generation method that is an embodiment of the invention.

FIG. 2 is a flow chart of an ad inventory generation method according to one embodiment of the invention. The method according to the present embodiment begins with a step 202 of receiving behavioural data into the ad network. Behavioural data as used herein can comprise emotional state information detected from collected facial expressions of the user. The emotions for which data is collected can comprise any one or more of angry, disgusted, neutral, sad, scared, happy and surprised, as well as their derivatives and combinations thereof. Other behavioural information (e.g. physical data such as head orientation or upper body posture) can also be collected. This information can be combined with emotional state information to derive further indicators of a computer user's reaction, e.g. engagement, etc.

Additionally or alternatively, the behavioural data can comprise other information that is collected from a user that interacts with media content, e.g., any of gestures, blood pressure or heart rate (which may be based on skin colour), blinking, etc. The behavioural data can be further processed to extract information indicative of a particular aspect of a user's behaviour that may arise from a combination of the detected emotional information. For example, the behavioural data can be processed to extract information indicative of a user's engagement with the display.

The method continues with a step 204 of determining whether or not an ad inventory generation condition exists based on the received behavioural data. A comparison can be made between the information indicative of one or more aspects of the user's behaviour (e.g. an emotion or a degree of engagement with the display) with a predetermined threshold. Thus, if the collected information indicates that a user's engagement is high, the determining step 204 indicate that an ad inventory generation condition is met.

According to certain embodiments, the determining process can comprise identifying a predetermined pattern in the user's behaviour, e.g., by comparing the time evolution of one or more behavioural data parameters against a predetermined target. The time evolution can be calculated over a predetermined period or window of data within the duration of the media content being viewed. For example, the media can be partitioned into a plurality of portions having different metadata. Information in the metadata can be used to trigger a determining process, or to set a particular ad inventory generation target.

Alternatively, the time evolution can be taken over the whole duration of the media content. The window can be fixed at a specific point within the media content, e.g., the final 5 or 10 seconds, or can be a moving window, whereby the temporal evolution of the relevant parameter or parameters over the immediately preceding period is assessed. Thus, for example, an ad inventory generation condition can be triggered when a user exhibits happiness above a certain level for more than 5 seconds, or if a large swing in a given emotion occurs within a given time period.

The step 204 of determining whether or not an ad inventory generation condition exists can be performed periodically throughout playback of media content. Alternatively or additionally, step 204 can be performed at certain predetermined times during the playback of the media content being viewed, e.g., at the end or at a change or scene or the like. Such trigger points can be determined according to metadata in one or more portions of the media.

Other factors may also be taken in account in determining if an ad inventory generation condition exists, e.g., time since last ad or time until next ad break. There can be a plurality of behavioural criteria used for determining if an ad inventory generation conditions exists. For example, an ad inventory generation condition can exist if any one or more or any combination of two or more of the plurality of criteria are satisfied. If the step 204 determines that an ad inventory generation condition does not exist, the method loops back to step 202 and the behavioural data continues to be collected.

If the step 204 determines that an ad inventory generation condition does exist, the method continues with a step 206 of generating an ad inventory. The ad inventory can be in a format suitable for communication to an ad exchange or advertiser in order to enable a decision about whether or not to purchase or bid for the ad inventory to be taken based on available ads and ad profile information obtained from their respective ad impressions. Thus, the ad inventory can comprise a set of properties that contain identification information for the ad inventory. For example, the set of properties can indicate any one or more of the size of the ad, the position of the ad on the display, and the duration of the ad. By way of further example, the set of properties may indicate if the ad inventory is a side banner or pop-up window on a webpage, or an overlaid frame on a media player. The ad inventory can be arranged to interrupt playback of the media content, e.g., cause the media content to be paused or otherwise disrupted until the ad is complete.

The set of properties of the ad inventory can include one or more properties that are selected based on the behavioural criterion or criteria that were fulfilled in order to trigger the ad inventory generation condition. In other words, the nature of the ad inventory can depend on the detected behavioural data of the user. For example, if the behavioural data indicates that the user is not engaged with the media content on the display, then an overlay type ad can be used. Alternatively, if the behavioural data indicates a high level of engagement, a full ad break, e.g., comprising a plurality of individual ads, can be provided.

The ad inventory can include context-specific information that identifies features of the media content being displayed during the collection of behavioural information. The context-specific information can be used by advertisers seeking to target their ads to a relevant audience. The collected behavioural information can be used to qualify the potential effectiveness of the context-specific information by providing feedback on a user's response to the media content. For example, if at the end of the media content the behavioural data indicates a suitably positive response, such as increase in happiness, then the set of properties in the ad inventory can include a flag or parameter to indicate that context-specific ads are likely to be effective. The opposite also applies: if at the end of the media content the behavioural data indicates a negative response, e.g., increase in anger, then the set of properties in the ad inventory can include a parameter to indicate that that context-specific ads are likely to be ineffective.

After the ad inventory is generated, the method continues with a step 208 of notifying the ad exchange or ad servers of the available ad inventory. An ad to fulfil the available ad inventory can be selected in a conventional manner, e.g., according to bidding rules or other procedures. For example, the ad inventory can be supplied to a real time bidding API for processing. The set of properties of the ad inventory can be used for this purpose.

After an ad is successfully chosen for the ad inventory, the method concludes with a step 210 of serving the ad to the user's computer.

Figure 3:
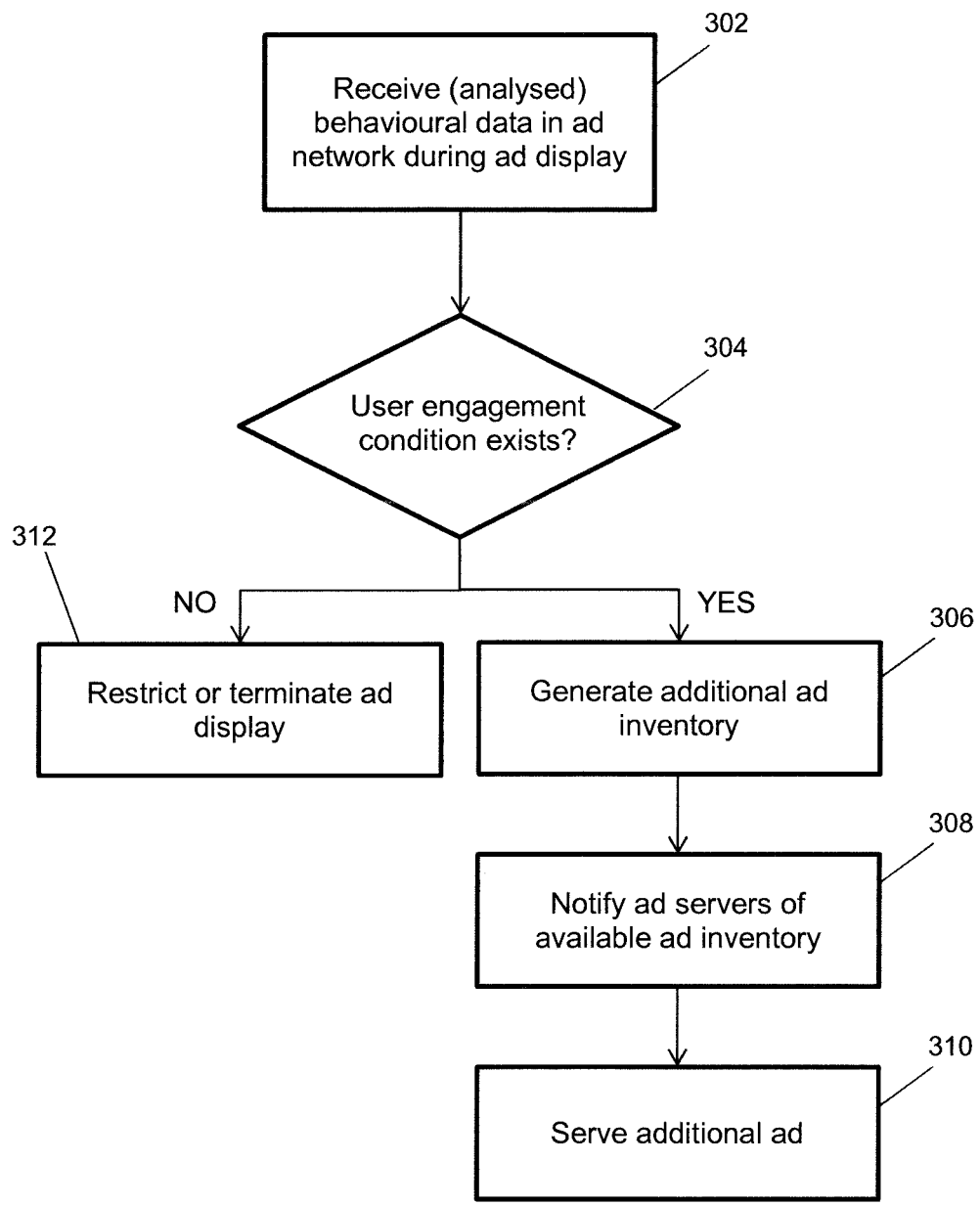
FIG. 3 is a flow chart depicting a method of dynamically updating ad inventory that is an embodiment of the invention.

FIG. 3 shows a flow chart illustrating one embodiment of a method of dynamically controlling an ad display based on behavioural information collected during the ad. In this method, properties of a current ad display or ad break can be adapted in real time based on the reaction of the user. Alternatively, the method can be used to control the existence or properties of future ad displays. For example, if the collected behavioural data indicates that the user is engaged with the ad, the ad display can be extended, e.g., by creating additional ad inventory. If the collected behavioural data indicates that the user is not engaged, the ad display can be restricted, e.g. terminated or shortened. Although user engagement is used in this example, the method can work with any detected emotion or combination of emotions.

The method shown in FIG. 3 begins with a step 302 of receiving behavioural data into the ad network. As with the method of FIG. 2, the behavioural data can have already been analysed to determine one or more relevant emotional states of the user before the behavioural data arrives in the ad network. The user's computing device, e.g., the device displaying the ad and collecting images of the user, can perform the analysis of the behavioural data. Alternatively, such analysis can be performed by other components comprising the system, such as the analysis sever. The method continues with a step 304 of determining if a user engagement condition exists. This determination may comprise obtaining, e.g., calculating or otherwise determining, a metric indicative of the user's engagement from the received behavioural data and comparing the value of the metric with a predetermined threshold. The metric can be arranged to indicate any change in the user's engagement during the ad display, as determined by a processor executing code to implement that functionality. The user engagement condition may exist if there is an increase in the user's engagement during the ad display. This step can also be performed in the user's computing device, if desired, or other components comprising the system.

If the step 304 determines that a user engagement condition does not exist, the method ends with a step 312 of terminating or otherwise restricting the ad display. Otherwise restricting the ad display may result in a shortening of the current ad being displayed, e.g., by selecting a shorter ending, or may result in reducing the size of the ad. Alternatively, the lack of user engagement can be used to prevent the current ad from being repeated, either forever or for a predetermined period of time. The lack of user engagement can also be used to restrict the display of future ads.

If the step 304 determines that a user engagement condition does exist, the method continues with a step 306 of generating additional ad inventory to extend the ad display. The additional ad inventory can be generated and can have a set of properties similar to the ad display that is being viewed.

After the ad inventory is generated, the method continues with a step 308 of notifying an ad exchange or ad servers of the additional ad inventory. Once an ad is successfully chosen for the ad inventory, the method concludes with a step 310 of serving the additional ad to the user's computer.

Figure 4:
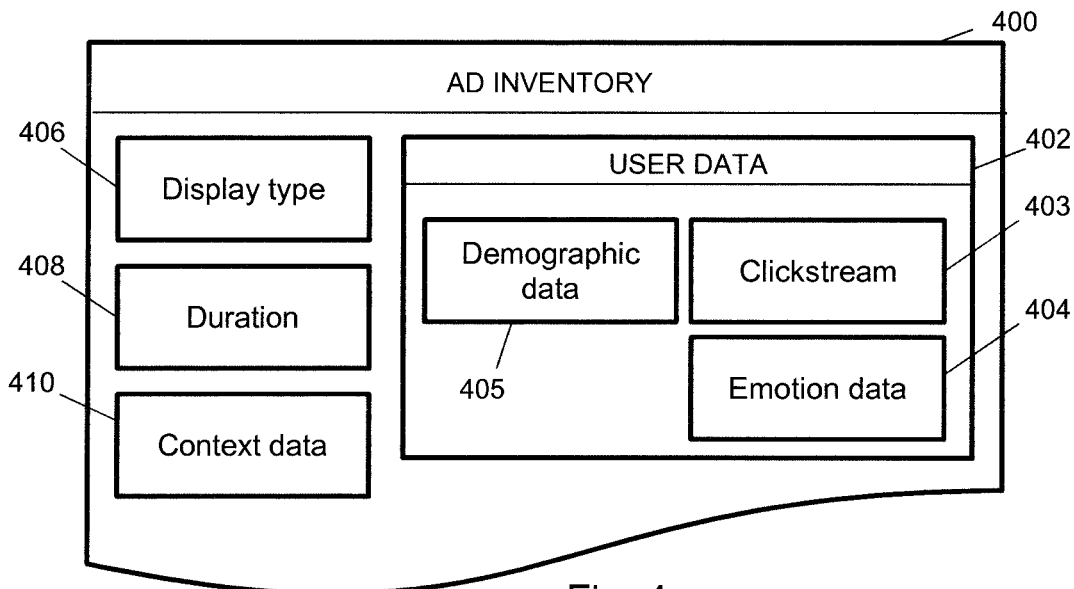
FIG. 4 is a schematic representation of an ad inventory that can be used with various embodiments of the present invention.

FIG. 4 is a schematic drawing of an ad inventory 400 that can be used with embodiments of the present invention. The ad inventory 400 comprises a plurality of data fields, which may maintain information indicative of a set of properties for the ad inventory. One exemplary data field is a display type field 406, which can indicate the type of ad (e.g., flat or interactive image, video, etc.) and its location (e.g., side banner, pop-up, overlay, etc.). Another exemplary data field is a duration field 408 that indicates the available length for the ad. Still another exemplary data fields is a context data field 410, which may maintain information about the environment in which the ad inventory is located, e.g., the context in which an ad served to fulfil the ad inventory would be displayed to the user. The context data can relate to the subject matter of the environment, e.g., encoded as keywords, and/or may relate to the type of media, e.g., website, video, music, etc.

The ad inventory can comprise user profile data 402 to provide information about the user, which can be used to influence the selection of an ad. The user profile data 402 may reference a clickstream 403 relating to the user's browsing history and/or demographic information 405 about the user themselves.

Optionally, the ad inventory 400 further comprises emotion profile data 404 relating to the user. Where the ad inventory is created on the fly using the method of FIG. 2 or FIG. 3, the emotion profile data 404 can comprise behavioural data that is collected for the user during the ad inventory generation process. However, emotion profile data 404 for a user can also be used in ad inventories for conventional ads. In this scenario, the emotion profile data 404 can comprise information derived from behavioural data collected for the user at the point of calling the ad to be used as a parameter for determining what ad to serve in response.

Figure 5:
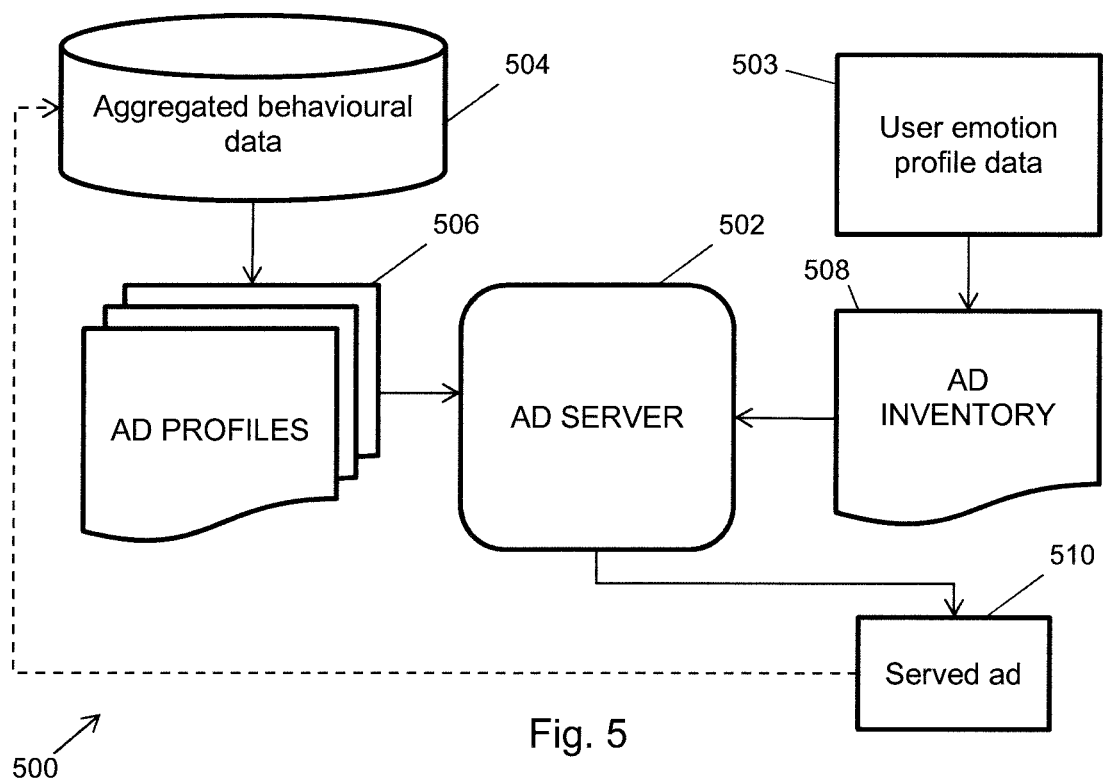
FIG. 5 is a schematic drawing of a system for serving ads based on aggregated behavioural data that is an embodiment of the invention.

In order to make use of emotion profile data in an ad inventory, it is desirable to provide corresponding behavioural data targets in an ad profile for an available ad. FIG. 5 is a schematic drawing illustrating one embodiment of a system 500 for determining behavioural data targets for an ad profile. In the system 500, an ad server 502 (or ad network or ad exchange) is arranged to receive a plurality of ad profiles 506 from one or more advertisers and an ad inventory 508 from an ad requestor, e.g., a website willing to host an ad or from a media player that is playing back media content. The ad server 502 is arranged to determine which ad 510 should be served in response to the ad request by comparing the ad profiles 506 to the ad inventory 508. This process can be automated using techniques known to those of skill in the art.

As explained above, the ad inventory can include emotion profile data 503 for the user that is based on behavioural data that has been collected for that user. In this embodiment, each ad profile 506 has one or more behavioural data parameters that are based on information from an aggregated behavioural data database 504. The contents of the database 504 may correspond to the behavioural data collected during impressions (e.g., viewable impressions) of each ad for which an ad profile in required. In other words, when an ad is served and an ad impression is generated, behavioural data for the user who creates the ad impression is collected and communicated to the database 504 (represented as a dotted line in FIG. 5).

In addition to the collected behavioural data, the ad impression can comprise other information about the user and the context in which the ad impression occurs. As more ad impressions are created for the ad, the database is able to aggregate the collected user behavioural data and establish a behavioural data "fingerprint" for the ad profile, which can in turn be used to better match the ad with available ad inventory. Each ad profile thus effectively includes group behavioural data, that is based on common features of the aggregated behavioural data collected for the ad impressions associated with that ad.

The present embodiment of the invention thus provides a method of dynamically generating ad inventory based on collected behavioural data for a user. This method may be used to generate otherwise conventional ad inventory that can be fulfilled with conventional ads. However, the invention can be enhanced by using collected behavioural data as profile parameters in either or both of a generated ad inventory or an available ad. These profile parameters are inserted into a profile which is now modified and which provides actionable information, for instance, which influences the manner in which certain ads managed and/or transmitted to users. In the case of the ad inventory, the profile parameter can be representative of collected behavioural data for an individual user, i.e. forming another part of the user data that is included in conventional ad inventories. In the case of the ad itself, the profile parameter can be representative of aggregated behavioural data from a plurality of users who have viewed the ad.

FIGS. 1 through 5 are conceptual illustrations allowing for an explanation of the embodiments of the present invention. It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more hardware processors (controllers, or the like) to cause the one or more processors to perform the functions of the invention as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; or the like.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments will so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

The invention claimed is:

1. A method of generating web-based advertising inventory, the method comprising:

collecting, at a networked computing device, behavioral data for a user during playback of media content on the networked computing device, wherein the playback of media content is associated with an online digital asset that is capable of displaying advertising content;

evaluating, by the networked computing device, a user engagement criterion using the collected behavioral data to generate data representative of one or more emotional states of the user which indicate the user's engagement with the media content;

determining, using the data representative of one or more emotional states of the user, if a predetermined condition is satisfied;

generating an ad inventory if the data representative of one or more emotional states of the user satisfies the predetermined condition, wherein the ad inventory comprises a data structure that identifies properties of an opportunity to display a web-based advertisement in the online digital asset; and notifying, by the networked computing device, a remote ad server or ad exchange of the generated ad inventory.

2. The method according to claim 1, wherein evaluating the user engagement criterion comprises:
   generating an engagement metric value that is indicative of the user's engagement with the media content; and
   comparing the extracted engagement metric value with a predetermined threshold.

3. The method according to claim 1, wherein the step of evaluating the user engagement criterion is performed periodically throughout playback of the media content.

4. The method according to claim 1, wherein the step of evaluating the user engagement criterion comprises calculating the time evolution of the user engagement criterion over a predetermined period of data within the duration of the media content.

5. The method according to claim 1, wherein collecting behavioral data comprises executing a data collection module on the networked computing device.

6. The method according to claim 5, wherein the data collection module performs the steps of evaluating the user engagement criterion and generating the ad inventory.

7. The method according to claim 1, comprising determining a property of the ad inventory based on the collected behavioral data.

8. The method according to claim 7, wherein the determined property is selected from the group consisting of: duration, type, and size.

9. The method according to claim 1 comprising generating an ad inventory profile parameter based on the collected behavioral data, wherein the generated ad inventory includes the ad inventory profile parameter.

10. The method according to claim 1, wherein collecting the behavioral data comprises obtaining facial images of the user during the playback of media content through use of a webcam connected to the networked computing device.

11. The method according to claim 1, wherein the data structure defines a size and position of a frame or window for displaying the web-based advertisement in the online digital asset.

* * * * *